(12) United States Patent
Hirano

(10) Patent No.: US 9,419,532 B2
(45) Date of Patent: Aug. 16, 2016

(54) ELECTRIC POWER CONVERSION SYSTEM AND ELECTRIC POWER CONVERSION METHOD FOR STOPPING POWER UPON A FAILURE

(71) Applicant: Takahiro Hirano, Toyota (JP)

(72) Inventor: Takahiro Hirano, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 270 days.

(21) Appl. No.: 14/177,638

(22) Filed: Feb. 11, 2014

(65) Prior Publication Data

US 2014/0233265 A1    Aug. 21, 2014

(30) Foreign Application Priority Data

Feb. 15, 2013   (JP) ................................. 2013-028357

(51) Int. Cl.
*H02M 1/32*      (2007.01)
*H02M 3/335*     (2006.01)

(52) U.S. Cl.
CPC .... *H02M 3/33576* (2013.01); *H02M 2001/325* (2013.01)

(58) Field of Classification Search
CPC ...... H02M 1/32; H02M 1/36; H02M 3/33507
USPC ............... 363/16, 17, 50, 78, 95, 98
See application file for complete search history.

(56) References Cited

U.S. PATENT DOCUMENTS

| | | | | |
|---|---|---|---|---|
| 4,156,273 A | * | 5/1979 | Sato | H02M 3/33507 323/901 |
| 4,694,193 A | * | 9/1987 | Schlenk | G05F 1/59 307/62 |
| 4,766,364 A | * | 8/1988 | Biamonte | G05F 1/59 307/58 |
| 4,914,560 A | * | 4/1990 | Oh | H02H 7/1213 363/19 |
| 5,001,318 A | * | 3/1991 | Noda | H01J 25/587 219/716 |
| 5,488,531 A | * | 1/1996 | Aldridge | H02J 1/10 361/18 |
| 5,737,202 A | * | 4/1998 | Shimamori | H02J 1/10 307/82 |
| 5,875,104 A | * | 2/1999 | Prager | H02J 1/102 363/65 |

(Continued)

FOREIGN PATENT DOCUMENTS

| | | |
|---|---|---|
| JP | 2008228517 A | 9/2008 |
| JP | 2011-193713 A | 9/2011 |
| JP | 2012175885 A | 9/2012 |

*Primary Examiner* — Jeffrey Sterrett
(74) *Attorney, Agent, or Firm* — Sughrue Mion, PLLC

(57) ABSTRACT

An electric power conversion system includes: a primary circuit including a first port, a second port and a primary electric power conversion unit; and a secondary circuit magnetically coupled to the primary circuit by a transformer and including a third port, a fourth port and a secondary electric power conversion unit. The electric power conversion system is configured to convert electric power between any two of the four ports with the use of the primary and secondary electric power conversion units, and convert electric power between the first and second ports and between the third and fourth ports with the use of electric power conversion circuit portions other than a faulty electric power conversion circuit portion among a plurality of electric power conversion circuit portions configured in the primary and secondary electric power conversion units.

9 Claims, 5 Drawing Sheets

(56) References Cited

U.S. PATENT DOCUMENTS

| | | | | |
|---|---|---|---|---|
| 5,894,413 A * | 4/1999 | Ferguson | H02J 1/10 | 307/43 |
| 5,894,415 A * | 4/1999 | Habegger | H02J 7/0031 | 307/85 |
| 6,031,743 A * | 2/2000 | Carpenter | H02J 1/102 | 307/48 |
| 6,317,346 B1 * | 11/2001 | Early | H02J 3/38 | 363/65 |
| 6,362,982 B1 * | 3/2002 | Despatie | H02M 5/458 | 363/131 |
| 6,385,060 B1 * | 5/2002 | Basso | H02M 1/36 | 363/21.07 |
| 6,737,763 B2 * | 5/2004 | Liu | H02J 1/102 | 363/65 |
| 7,133,300 B1 * | 11/2006 | Yang | H02M 3/33507 | 323/284 |
| 7,518,889 B2 * | 4/2009 | Baurle | H02M 3/33507 | 363/21.12 |
| 8,014,178 B2 * | 9/2011 | Radbrant | H02J 3/36 | 307/71 |
| 8,039,989 B2 * | 10/2011 | Chung | H02J 1/102 | 363/131 |
| 8,611,114 B2 * | 12/2013 | Hiller | H02M 7/49 | 363/71 |
| 2006/0227578 A1 * | 10/2006 | Datta | H02M 7/49 | 363/65 |
| 2009/0168469 A1 * | 7/2009 | Dishman | H02J 1/102 | 363/50 |
| 2009/0189582 A1 * | 7/2009 | Watanabe | H02M 1/32 | 323/282 |
| 2011/0198933 A1 | 8/2011 | Ishigaki et al. | | |
| 2014/0078797 A1 * | 3/2014 | Mihalache | H02M 7/49 | 363/71 |
| 2014/0132066 A1 * | 5/2014 | Hirano | H02M 3/33584 | 307/17 |
| 2014/0133187 A1 * | 5/2014 | Hirano | H02M 3/33592 | 363/17 |
| 2014/0160802 A1 * | 6/2014 | Zhang | H02M 3/335 | 363/21.01 |
| 2014/0233265 A1 * | 8/2014 | Hirano | H02M 3/33576 | 363/17 |
| 2014/0346871 A1 * | 11/2014 | Hirano | H02M 3/33584 | 307/24 |
| 2014/0347890 A1 * | 11/2014 | Hirano | H02M 3/33561 | 363/17 |
| 2015/0229217 A1 * | 8/2015 | Hirano | H02M 3/33507 | 363/17 |
| 2015/0244278 A1 * | 8/2015 | Hirano | H02M 3/33576 | 307/24 |
| 2015/0263632 A1 * | 9/2015 | Hirano | H02M 3/33546 | 363/17 |
| 2015/0295501 A1 * | 10/2015 | Hirano | H02M 3/3353 | 363/17 |
| 2015/0295502 A1 * | 10/2015 | Hirano | H02M 1/36 | 363/17 |

* cited by examiner

ELECTRIC POWER CONVERSION SYSTEM AND ELECTRIC POWER CONVERSION METHOD FOR STOPPING POWER UPON A FAILURE

INCORPORATION BY REFERENCE

The disclosure of Japanese Patent Application No. 2013-028357 filed on Feb. 15, 2013 including the specification, drawings and abstract is incorporated herein by reference in its entirety.

BACKGROUND OF THE INVENTION

1. Field of the Invention

The invention relates to an electric power conversion technique for an electric power conversion system that includes a primary circuit and a secondary circuit magnetically coupled to the primary circuit via a transformer.

2. Description of Related Art

For example, Japanese Patent Application Publication No. 2011-193713 (JP 2011-193713 A) is known as a related art document that describes an electric power conversion technique for an electric power conversion system including a primary circuit and a secondary circuit magnetically coupled to the primary circuit via a transformer. The electric power conversion system described in JP 2011-193713 A converts electric power with the use of electric power conversion units between two ports selected from among four ports that are a combination of two ports of the primary circuit and two ports of the secondary circuit. The electric power conversion units are respectively configured in the primary circuit and the secondary circuit.

However, JP 2011-193713 A does not describe effective means for continuing to convert electric power between the ports even when there is a failure in the electric power conversion units respectively configured in the primary circuit and the secondary circuit.

SUMMARY OF THE INVENTION

The invention provides an electric power conversion system and an electric power conversion method that are able to continue to convert electric power between ports even when there is a failure in electric power conversion units respectively configured in a primary circuit and a secondary circuit.

A first aspect of the invention provides an electric power conversion system. The electric power conversion system includes: a primary circuit including a first port, a second port and a primary electric power conversion unit; and a secondary circuit magnetically coupled to the primary circuit by a transformer and including a third port, a fourth port and a secondary electric power conversion unit. The primary electric power conversion unit and the secondary electric power conversion unit are configured to convert electric power between any two of the four ports, and electric power conversion circuit portions other than a faulty electric power conversion circuit portion among a plurality of electric power conversion circuit portions configured in the primary electric power conversion unit and the secondary electric power conversion unit are configured to convert electric power between the first port and the second port and between the third port and the fourth port.

A second aspect of the invention provides an electric power conversion method. The electric power conversion method includes: among four ports, that is, a first port and a second port of a primary circuit and a third port and a fourth port of a secondary circuit magnetically coupled to the primary circuit by a transformer, converting electric power between any two of the four ports with the use of electric power conversion units respectively configured in the primary circuit and the secondary circuit; and, when there occurs a failure in any one of a plurality of electric power conversion circuit portions configured in the electric power conversion units, converting electric power between the first port and the second port and between the third port and the fourth port with the use of the electric power conversion circuit portions other than the faulty electric power conversion circuit portion among the plurality of electric power conversion circuit portions.

According to the above first and second aspects, it is possible to continue to convert electric power between the ports even when there occurs a failure in the electric power conversion units respectively configured in the primary circuit and the secondary circuit.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

<Configuration of Electric Power Conversion System 100>

Figure 1:
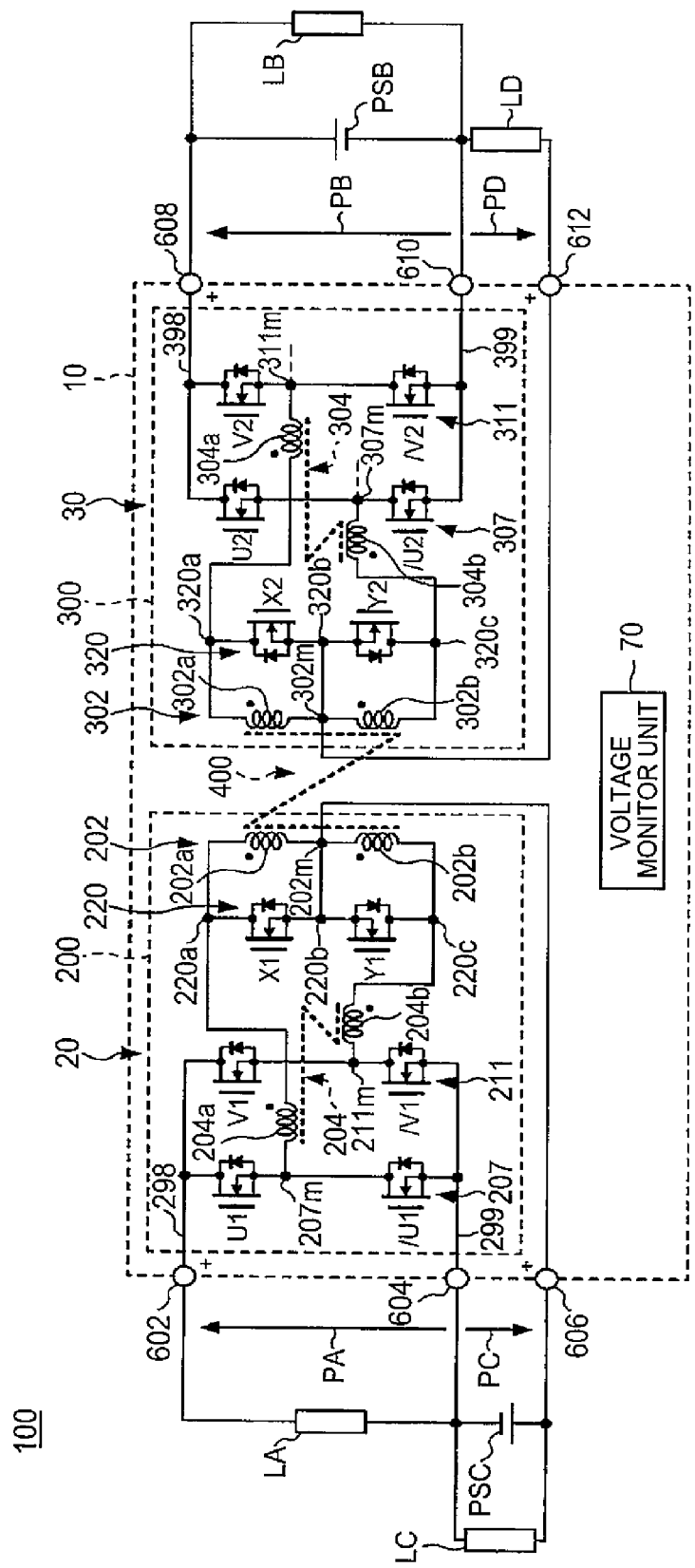
FIG. 1 is a configuration view of an electric power conversion system according to an embodiment of the invention.

FIG. 1 is a view that shows an electric power conversion system 100 that includes an electric power conversion circuit 10. The electric power conversion system 100 is an electric power conversion system configured to include the electric power conversion circuit 10 and a control circuit 50 (see FIG. 2, and the details will be described later). The electric power conversion circuit 10 has the function of selecting any two input/output ports from among four input/output ports and converting electric power between the selected two input/output ports. The electric power conversion circuit 10 is configured to include a primary conversion circuit 20 and a secondary conversion circuit 30. The primary conversion circuit 20 and the secondary conversion circuit 30 are magnetically coupled to each other via a transformer 400 (center tap transformer).

The primary conversion circuit 20 is configured to include a primary full-bridge circuit 200, a first input/output port PA and a second input/output port PC. The primary full-bridge circuit 200 is configured to include a primary coil 202 of the transformer 400, a primary magnetic coupling reactor 204, a primary first upper arm U1, a primary first lower arm/U1, a primary second upper arm V1 and a primary second lower arm/V1. Here, the primary first upper arm U1, the primary first lower arm/U1, the primary second upper arm V1 and the primary second lower arm/V1 each are, for example, a switching element configured to include an N-channel MOS- FET and a body diode that is a parasitic element of the MOSFET. A diode may be additionally connected in parallel with the MOSFET.

The primary full-bridge circuit 200 includes a primary positive electrode bus 298 and a primary negative electrode bus 299. The primary positive electrode bus 298 is connected to a high-potential terminal 602 of the first input/output port PA. The primary negative electrode bus 299 is connected to a low-potential terminal 604 of the first input/output port PA and second input/output port PC.

A primary first arm circuit 207 is connected between the primary positive electrode bus 298 and the primary negative electrode bus 299. The primary first arm circuit 207 is formed by serially connecting the primary first upper arm U1 and the primary first lower arm/U1. The primary first arm circuit 207 is a primary first electric power conversion circuit portion that is able to carry out electric power conversion operation through on/off operation of each of the primary first upper arm U1 and the primary first lower arm/U1. Furthermore, a primary second arm circuit 211 is connected between the primary positive electrode bus 298 and the primary negative electrode bus 299 in parallel with the primary first arm circuit 207. The primary second arm circuit 211 is formed by serially connecting the primary second upper arm V1 and the primary second lower arm/V1. The primary second arm circuit 211 is a primary second electric power conversion circuit portion that is able to carry out electric power conversion operation through on/off operation of each of the primary second upper arm V1 and the primary second lower arm/V1.

The primary coil 202 and the primary magnetic coupling reactor 204 are provided at a bridge portion that connects a midpoint 207m of the primary first arm circuit 207 to a midpoint 211m of the primary second arm circuit 211. A connection relationship at the bridge portion will be described in more detail. One end of a primary first reactor 204a of the primary magnetic coupling reactor 204 is connected to the midpoint 207m of the primary first arm circuit 207. One end of the primary coil 202 is connected to the other end of the primary first reactor 204a. Furthermore, one end of a primary second reactor 204b of the primary magnetic coupling reactor 204 is connected to the other end of the primary coil 202. Moreover, the other end of the primary second reactor 204b is connected to the midpoint 211m of the primary second arm circuit 211. The primary magnetic coupling reactor 204 is configured to include the primary first reactor 204a and the primary second reactor 204b magnetically coupled to the primary first reactor 204a.

The midpoint 207m is a primary first intermediate node between the primary first upper arm U1 and the primary first lower arm/U1. The midpoint 211m is a primary second intermediate node between the primary second upper arm V1 and the primary second lower arm/V1.

The first input/output port PA is a port provided between the primary positive electrode bus 298 and the primary negative electrode bus 299. The first input/output port PA is configured to include the terminal 602 and the terminal 604. The second input/output port PC is a port provided between the primary negative electrode bus 299 and a center tap 202m of the primary coil 202. The second input/output port PC is configured to include the terminal 604 and a terminal 606.

The center tap 202m is connected to the high-potential terminal 606 of the second input/output port PC. The center tap 202m is an intermediate connection point between a primary first winding 202a and a primary second winding 202b that constitute the primary coil 202.

The electric power conversion system 100 is, for example, configured to include the primary high voltage system load LA, a primary low voltage system load LC and a primary low voltage system power supply PSC. The primary high voltage system load LA is connected to the first input/output port PA. The primary low voltage system load LC and the primary low voltage system power supply PSC are connected to the second input/output port PC. The primary low voltage system power supply PSC supplies electric power to the primary low voltage system load LC that operates at the same voltage system (for example, 12 V system) as the primary low voltage system power supply PSC. In addition, the primary low voltage system power supply PSC supplies electric power, stepped up by the primary full-bridge circuit 200, to the primary high voltage system load LA that operates at the voltage system (for example, 48 V system higher than 12 V system) different from that of the primary low voltage system power supply PSC. A specific example of the primary low voltage system power supply PSC is a secondary battery, such as a lead-acid battery.

The secondary conversion circuit 30 is a secondary circuit configured to include a secondary full-bridge circuit 300, a third input/output port PB and a fourth input/output port PD. The secondary full-bridge circuit 300 is a secondary electric power conversion unit configured to include a secondary coil 302 of the transformer 400, a secondary magnetic coupling reactor 304, a secondary first upper arm U2, a secondary first lower arm/U2, a secondary second upper arm V2 and a secondary second lower arm/V2. Here, the secondary first upper arm U2, the secondary first lower arm/U2, the secondary second upper arm V2 and the secondary second lower arm/V2 each are, for example, a switching element configured to include an N-channel MOSFET and a body diode that is a parasitic element of the MOSFET. A diode may be additionally connected in parallel with the MOSFET.

The secondary full-bridge circuit 300 includes a secondary positive electrode bus 398 and a secondary negative electrode bus 399. The secondary positive electrode bus 398 is connected to a high-potential terminal 608 of the third input/output port PB. The secondary negative electrode bus 399 is connected to a low-potential terminal 610 of the third input/output port PB and fourth input/output port PD.

A secondary first arm circuit 307 is connected between the secondary positive electrode bus 398 and the secondary negative electrode bus 399. The secondary first arm circuit 307 is formed by serially connecting the secondary first upper arm U2 and the secondary first lower arm/U2. The secondary first arm circuit 307 is a secondary first electric power conversion circuit portion that is able to carry out electric power conversion operation through on/off operation of each of the secondary first upper arm U2 and the secondary first lower arm/U2. Furthermore, a secondary second arm circuit 311 is connected between the secondary positive electrode bus 398 and the secondary negative electrode bus 399 in parallel with the secondary first arm circuit 307. The secondary second arm circuit 311 is formed by serially connecting the secondary second upper arm V2 and the secondary second lower arm/V2. The secondary second arm circuit 311 is a secondary second electric power conversion circuit portion that is able to carry out electric power conversion operation through on/off operation of each of the secondary second upper arm V2 and the secondary second lower arm/V2.

The secondary coil 302 and the secondary magnetic coupling reactor 304 are provided at a bridge portion that connects a midpoint 307m of the secondary first arm circuit 307 to a midpoint 311m of the secondary second arm circuit 311. A connection relationship at the bridge portion will be described in more detail. One end of a secondary first reactor 304a of the secondary magnetic coupling reactor 304 is connected to the midpoint 311m of the secondary second arm circuit 311. One end of the secondary coil 302 is connected to the other end of the secondary first reactor 304a. Furthermore, one end of a secondary second reactor 304b of the secondary magnetic coupling reactor 304 is connected to the other end of the secondary coil 302. Moreover, the other end of the secondary second reactor 304b is connected to the midpoint 307m of the secondary first arm circuit 307. The secondary magnetic coupling reactor 304 is configured to include the secondary first reactor 304a and the secondary second reactor 304b magnetically coupled to the secondary first reactor 304a.

The midpoint 307m is a secondary first intermediate node between the secondary first upper arm U2 and the secondary first lower arm/U2. The midpoint 311m is a secondary second intermediate node between the secondary second upper arm V2 and the secondary second lower arm/V2.

The third input/output port PB is a port provided between the secondary positive electrode bus 398 and the secondary negative electrode bus 399. The third input/output port PB is configured to include the terminal 608 and the terminal 610. The fourth input/output port PD is a port provided between the secondary negative electrode bus 399 and a center tap 302m of the secondary coil 302. The fourth input/output port PD is configured to include the terminal 610 and a terminal 612.

The center tap 302m is connected to the high-potential terminal 612 of the fourth input/output port PD. The center tap 302m is an intermediate connection point between a secondary first winding 302a and a secondary second winding 302b that constitute the secondary coil 302.

The electric power conversion system 100 is, for example, configured to include a secondary high voltage system load LB, a secondary high voltage system power supply PSB and a secondary low voltage system load LD. The secondary high voltage system load LB and the secondary high voltage system power supply PSB are connected to the third input/output port PB. The secondary low voltage system load LD is connected to the fourth input/output port PD. The secondary high voltage system power supply PSB supplies electric power to the secondary high voltage system load LB that operates at the same voltage system (for example, 288V system higher than 12 V system or 48 V system) as the secondary high voltage system power supply PSB. In addition, the secondary high voltage system power supply PSB supplies electric power, stepped down by the secondary full-bridge circuit 300, to the secondary low voltage system load LD that operates at the voltage system (for example, 72 V system lower than 288 V system) different from the secondary high voltage system power supply PSB. A specific example of the secondary high voltage system power supply PSB is a secondary battery, such as a lithium ion battery.

The electric power conversion circuit 10 of the electric power conversion system 100 includes bypass circuits, each of which short-circuits both ends of a corresponding one of the coils configured in the transformer 400. The transformer 400 does not function because of the bypass circuits, so it is possible to stop transfer of electric power between the primary conversion circuit 20 and the secondary conversion circuit 30. Thus, although details will be described later, it is possible to cause each of the primary conversion circuit 20 and the secondary conversion circuit 30 to carry out step-up/step-down operation at a selected step-up/step-down ratio. FIG. 1 illustrates a primary bypass circuit 220 and a secondary bypass circuit 320 as the above bypass circuits.

The primary bypass circuit 220 includes short circuit means for directly connecting the primary magnetic coupling reactor 204 to the center tap 202m without passing through the primary coil 202 configured in the transformer 400. The primary bypass circuit 220 includes a primary first short circuit control element X1 and a primary second short circuit control element Y1 as the short circuit means. The primary first short circuit control element X1 is able to short-circuit both ends of a primary first winding 202a. The primary second short circuit control element Y1 is able to short-circuit both ends of a primary second winding 202b. An intermediate connection point 220b between the primary first short circuit control element X1 and the primary second short circuit control element Y1 is connected to the center tap 202m.

The primary first short circuit control element X1 is, for example, a switching element configured to include an N-channel MOSFET and a body diode that is a parasitic element of the MOSFET. The primary second short circuit control element Y1 is, for example, a switching element configured to include a P-channel MOSFET and a body diode that is a parasitic element of the MOSFET. A diode may be additionally connected in parallel with each of the MOSFET of the primary first short circuit control element X1 and the MOSFET of the primary second short circuit control element Y1.

When the primary first short circuit control element X1 switches from an off state to an on state, both ends of the primary first winding 202a are short-circuited. Thus, a bypass line that directly connects an upper intermediate connection point 220a to the center tap 202m without passing through the primary first winding 202a is formed. At the upper intermediate connection point 220a, one end of the primary first reactor 204a is connected to one end of the primary first winding 202a. Similarly, when the primary second short circuit control element Y1 switches from an off state to an on state, both ends of the primary second winding 202b are short-circuited. Thus, a bypass line that directly connects a lower intermediate connection point 220c to the center tap 202m without passing through the primary second winding 202b is formed. At the lower intermediate connection point 220c, one end of the primary second reactor 204b is connected to one end of the primary second winding 202b.

In addition, when both the primary first short circuit control element X1 and the primary second short circuit control element Y1 switch from the off state to the on state, both ends (the upper intermediate connection point 220a and the lower intermediate connection point 220c) of the primary coil 202 are short-circuited.

The secondary bypass circuit 320 includes short circuit means for directly connecting the secondary magnetic coupling reactor 304 to the center tap 302m without passing through the secondary coil 302 configured in the transformer 400. The secondary bypass circuit 320 includes a secondary first short circuit control element X2 and a secondary second short circuit control element Y2 as the short circuit means. The secondary first short circuit control element X2 is able to short-circuit both ends of a secondary first winding 302a. The secondary second short circuit control element Y2 is able to short-circuit both ends of a secondary second winding 302b. An intermediate connection point 320b between the secondary first short circuit control element X2 and the secondary second short circuit control element Y2 is connected to the center tap 302m.

The secondary first short circuit control element X2 is, for example, a switching element configured to include an N-channel MOSFET and a body diode that is a parasitic element of the MOSFET. The secondary second short circuit control element Y2 is, for example, a switching element configured to include a P-channel MOSFET and a body diode that is a parasitic element of the MOSFET. A diode may be additionally connected in parallel with each of the MOSFET of the secondary first short circuit control element X2 and the MOSFET of the secondary second short circuit control element Y2.

When the secondary first short circuit control element X2 switches from an off state to an on state, both ends of the secondary first winding 302a are short-circuited. Thus, a bypass line that directly connects an upper intermediate connection point 320a to the center tap 302m without passing through the secondary first winding 302a is formed. At the upper intermediate connection point 320a, one end of the secondary first reactor 304a is connected to one end of the secondary first winding 302a. Similarly, when the secondary second short circuit control element Y2 switches from an off state to an on state, both ends of the secondary second winding 302b are short-circuited. Thus, a bypass line that directly connects a lower intermediate connection point 320c to the center tap 302m without passing through the secondary second winding 302b is formed. At the lower intermediate connection point 320c, one end of the secondary second reactor 304b is connected to one end of the secondary second winding 302b.

In addition, when both the secondary first short circuit control element X2 and the secondary second short circuit control element Y2 switch from the off state to the on state, both ends (the upper intermediate connection point 320a and the lower intermediate connection point 320c) of the secondary coil 302 are short-circuited.

The electric power conversion circuit 10 of the electric power conversion system 100 includes a voltage monitor unit 70 that monitors voltages at predetermined portions of the electric power conversion circuit 10. The voltage monitor unit 70, for example, monitors the voltage of the first input/output port PA, the voltage of the second input/output port PC, the voltage of the third input/output port PB and the voltage of the fourth input/output port PD. In addition, the voltage monitor unit 70 may monitor the voltages at the midpoints 207m, 211m, 307m, 311m.

Figure 2:
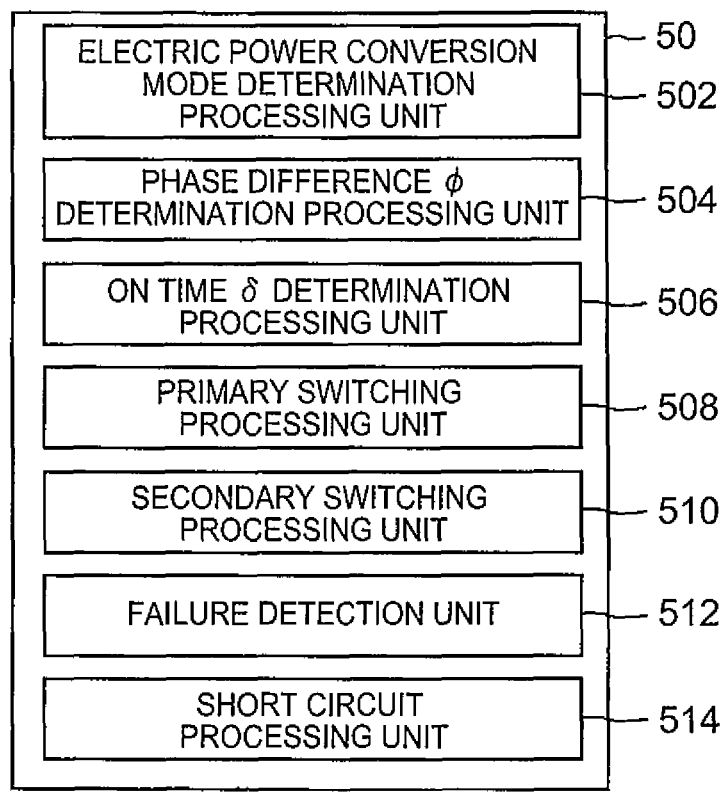
FIG. 2 is a block diagram of a control circuit according to the embodiment.

FIG. 2 is a block diagram of the control circuit 50. The control circuit 50 is a control unit that has the function of executing switching control over the switching elements, such as the primary first upper arm U1, of the primary conversion circuit 20 and the switching elements, such as the secondary first upper arm U2, of the secondary conversion circuit 30. The control circuit 50 is configured to include an electric power conversion mode determination processing unit 502, a phase difference φ determination processing unit 504, an on time δ determination processing unit 506, a primary switching processing unit 508, a secondary switching processing unit 510, a failure detection unit 512 and a short circuit processing unit 514. The control circuit 50 is, for example, an electronic circuit including a microcomputer that incorporates a CPU.

The electric power conversion mode determination processing unit 502 selects and determines an operation mode from among electric power conversion modes A to L of the electric power conversion circuit 10, described below, on the basis of an external signal (not shown). The electric power conversion modes include the mode A, the mode B and the mode C. In the mode A, electric power input from the first input/output port PA is converted and output to the second input/output port PC. In the mode B, electric power input from the first input/output port PA is converted and output to the third input/output port PB. In the mode C, electric power input from the first input/output port PA is converted and output to the fourth input/output port PD.

In addition, the electric power conversion modes further include the mode D, the mode E and the mode F. In the mode D, electric power input from the second input/output port PC is converted and output to the first input/output port PA. In the mode E, electric power input from the second input/output port PC is converted and output to the third input/output port PB. In the mode F, electric power input from the second input/output port PC is converted and output to the fourth input/output port PD.

The electric power conversion modes further include the mode G, the mode H and the mode I. In the mode G, electric power input from the third input/output port PB is converted and output to the first input/output port PA. In the mode H, electric power input from the third input/output port PB is converted and output to the second input/output port PC. In the mode I, electric power input from the third input/output port PB is converted and output to the fourth input/output port PD.

Moreover, the electric power conversion modes further include the mode J, the mode K and the mode L. In the mode J, electric power input from the fourth input/output port PD is converted and output to the first input/output port PA. In the mode K, electric power input from the fourth input/output port PD is converted and output to the second input/output port PC. In the mode L, electric power input from the fourth input/output port PD is converted and output to the third input/output port PB.

The phase difference φ determination processing unit 504 has the function of setting a phase difference φ in the switching period of the switching elements between the primary conversion circuit 20 and the secondary conversion circuit 30 in order to cause the electric power conversion circuit 10 to function as a DC-DC converter circuit.

The on time δ determination processing unit 506 has the function of setting an on time δ of each of the switching elements of the primary conversion circuit 20 and secondary conversion circuit 30 in order to cause each of the primary conversion circuit 20 and the secondary conversion circuit 30 to function as a step-up/step-down circuit.

The primary switching processing unit 508 has the function of executing switching control over the switching elements, that is, the primary first upper arm U1, the primary first lower arm/U1, the primary second upper arm V1 and the primary second lower arm/V1, on the basis of outputs of the electric power conversion mode determination processing unit 502, phase difference φ determination processing unit 504 and on time δ determination processing unit 506.

The secondary switching processing unit 510 has the function of executing switching control over the switching elements, that is, the secondary first upper arm U2, the secondary first lower arm/U2, the secondary second upper arm V2 and the secondary second lower arm/V2, on the basis of the outputs of the electric power conversion mode determination processing unit 502, phase difference φ determination processing unit 504 and on time δ determination processing unit 506.

The failure detection unit 512 has the function of detecting a failure of any one of the plurality of arm circuits configured in the primary full-bridge circuit 200 and the secondary full-bridge circuit 300 on the basis of predetermined external signals that are supplied from the voltage monitor unit 70 (see FIG. 1), and the like.

The failure detection unit 512, for example, detects a failure in the primary first arm circuit 207 and the primary second arm circuit 211 that are configured in the primary full-bridge circuit 200 on the basis of the detected signal obtained by monitoring the voltage of the corresponding predetermined portion of the primary conversion circuit 20 with the use of the voltage monitor unit 70. The failure detection unit 512, for example, detects a failure in the primary first arm circuit 207 on the basis of the monitored voltage at the midpoint 207m, and detects a failure in the primary second arm circuit 211 on the basis of the monitored voltage at the midpoint 211m.

For example, when a command for turning off the primary second lower arm/V1 is issued and the voltage at the midpoint 211m is equal to the voltage of the primary negative electrode bus 299, the failure detection unit 512 determines that the primary second lower arm/V1 has a short-circuit failure. In addition, for example, when a command for turning on the primary second lower arm/V1 is issued and the voltage at the midpoint 211m is different from the voltage of the primary negative electrode bus 299, the failure detection unit 512 determines that the primary second lower arm/V1 has an open-circuit failure. This also applies to failure detection for the primary first lower arm/U1.

For example, when a command for turning off the primary first upper arm U1 is issued and the voltage at the midpoint 207m is equal to the voltage of the primary positive electrode bus 298, the failure detection unit 512 determines that the primary first upper arm U1 has a short-circuit failure. When a command for turning on the primary first upper arm U1 is issued and the voltage at the midpoint 207m is different from the voltage of the primary positive electrode bus 298, the failure detection unit 512 determines that the primary first upper arm U1 has an open-circuit failure. This also applies to failure detection for the primary second upper arm V1.

The failure detection unit 512, for example, detects a failure in the secondary first arm circuit 307 and the secondary second arm circuit 311 that are configured in the secondary full-bridge circuit 300 on the basis of the detected signal obtained by monitoring the voltage of the predetermined portion of the secondary conversion circuit 30 with the use of the voltage monitor unit 70. A configuration similar to the above configuration may also be applied to failure detection for the switching elements configured in the secondary first arm circuit 307 and the secondary second arm circuit 311.

In addition, failure detection for each arm circuit is not limited to failure detection for the switching elements configured in each arm circuit, and may include failure detection for wires connected to the electrodes of each switching element (for example, break abnormality detection, detection of a short circuit with another wire). Failure detection may be carried out on, for example, a wire that connects the high-side switching element and the low-side switching element, configured in each arm circuit, to each other via the midpoint of both elements, a wire that connects the high-side switching element to the positive electrode bus or a wire that connects the low-side switching element to the negative electrode bus.

The short circuit processing unit 514 has the function of executing short circuit control over both ends of each of the coils configured in the transformer 400 on the basis of the failure detection result of the failure detection unit 512.

<Operation of Electric Power Conversion System 100>

The operation of the electric power conversion system 100 will be described with reference to FIG. 1. For example, when an external signal that requires the electric power conversion circuit 10 to operate in the mode F is input, the electric power conversion mode determination processing unit 502 of the control circuit 50 determines the electric power conversion mode of the electric power conversion circuit 10 as the mode F. At this time, the voltage input to the second input/output port PC is stepped up by the step-up function of the primary conversion circuit 20, the stepped-up voltage is transferred to the third input/output port PB side by the function of the electric power conversion circuit 10 as the DC-DC converter circuit and is further stepped down by the step-down function of the secondary conversion circuit 30, and the resultant voltage is output from the fourth input/output port PD.

Here, the details of the step-up/step-down function of the primary conversion circuit 20 will be described in detail. Focusing on the second input/output port PC and the first input/output port PA, the terminal 606 of the second input/output port PC is connected to the midpoint 207m of the primary first arm circuit 207 via the primary first winding 202a and the primary first reactor 204a serially connected to the primary first winding 202a. Both ends of the primary first arm circuit 207 are connected to the first input/output port PA, with the result that a step-up/step-down circuit is connected between the terminal 606 of the second input/output port PC and the first input/output port PA.

Furthermore, the terminal 606 of the second input/output port PC is connected to the midpoint 211m of the primary second arm circuit 211 via the primary second winding 202b and the primary second reactor 204b serially connected to the primary second winding 202b. Both ends of the primary second arm circuit 211 are connected to the first input/output port PA, with the result that a step-up/step-down circuit is connected between the terminal 606 of the second input/output port PC and the first input/output port PA in parallel with the above-described step-up/step-down circuit. The secondary conversion circuit 30 is a circuit having a substantially similar configuration to that of the primary conversion circuit 20, with the result that two step-up/step-down circuits are connected in parallel with each other between the terminal 612 of the fourth input/output port PD and the third input/output port PB. Thus, the secondary conversion circuit 30 has a similar step-up/step-down function to that of the primary conversion circuit 20.

Next, the function of the electric power conversion circuit 10 as the DC-DC converter circuit will be described in detail. Focusing on the first input/output port PA and the third input/output port PB, the primary full-bridge circuit 200 is connected to the first input/output port PA, and the secondary full-bridge circuit 300 is connected to the third input/output port PB. The primary coil 202 provided at the bridge portion of the primary full-bridge circuit 200 and the secondary coil 302 provided at the bridge portion of the secondary full-bridge circuit 300 are magnetically coupled to each other, thus functioning as the transformer 400 (the center tap transformer having a winding number ratio of 1:N). Thus, by adjusting the phase difference of the switching period of the switching elements between the primary full-bridge circuit 200 and the secondary full-bridge circuit 300, it is possible to convert electric power input to the first input/output port PA and transfer the electric power to the third input/output port PB or convert electric power input to the third input/output port PB and transfer the electric power to the first input/output port PA.

Figure 4:
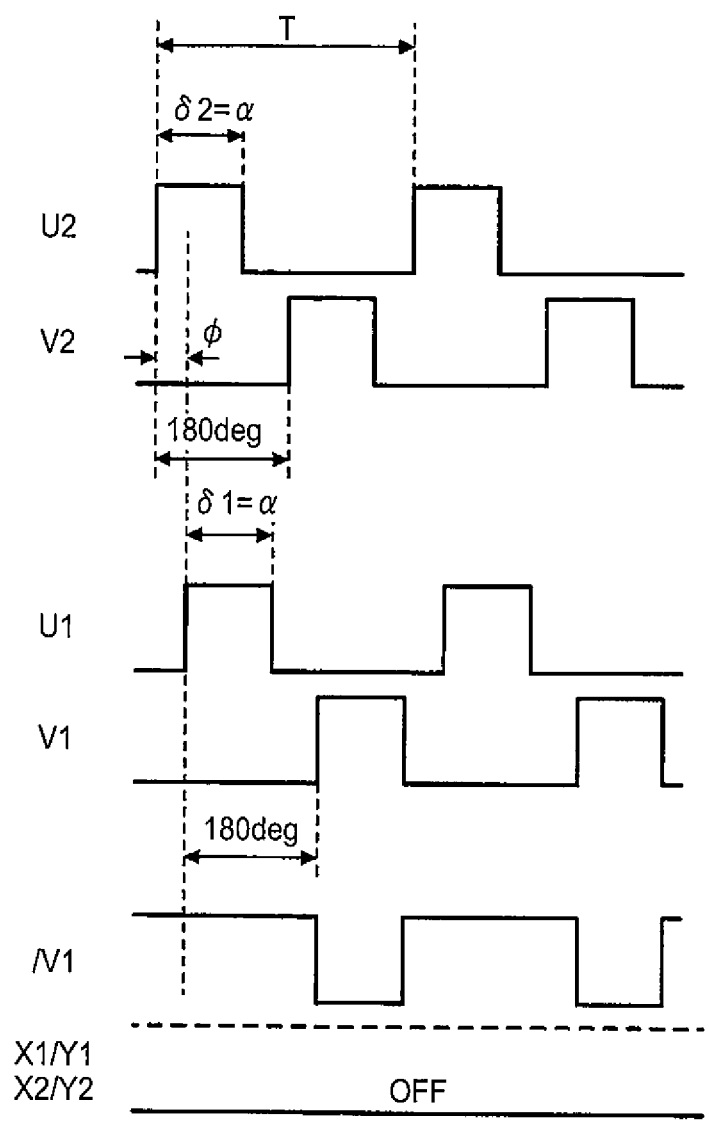
FIG. 4 is a timing chart during normal times according to the embodiment.

FIG. 4 is a view that shows a timing chart regarding voltages supplied to the electric power conversion circuit 10 through control over the control circuit 50. In FIG. 4, U1 indicates an on/off waveform of the primary first upper arm U1, V1 indicates an on/off waveform of the primary second upper arm V1, U2 is an on/off waveform of the secondary first upper arm U2, and V2 is an on/off waveform of the secondary second upper arm V2. On/off waveforms of the primary first lower arm/U1, primary second lower arm/V1, secondary first lower arm/U2 and secondary second lower arm/V2 are respectively waveforms inverted from the on/off waveforms of the primary first upper arm U1, primary second upper arm V1, secondary first upper arm U2 and secondary second upper arm V2 (not shown). It is desirable that a dead time be provided between both on/off waveforms of each pair of upper and lower arms such that no flow-through current flows as a result of the on states of both upper and lower arms. In FIG. 4, the high level indicates the on state, and the low level indicates the off state.

Here, by changing the on time δ of each of U1, V1, U2, V2, it is possible to change a step-up/step-down ratio of the primary conversion circuit 20 and a step-up/step-down ratio of the secondary conversion circuit 30. For example, by equalizing the on time δ of each of U1, V1, U2, V2 to one another, it is possible to equalize the step-up/step-down ratio of the primary conversion circuit 20 to the step-up/step-down ratio of the secondary conversion circuit 30. The phase difference between U1 and V1 is set to 180 degrees (π), and the phase difference between U2 and V2 is also set to 180 degrees (π). Furthermore, by changing the phase difference ϕ between U1 and U2, it is possible to adjust the amount of electric power transferred between the primary conversion circuit 20 and the secondary conversion circuit 30. When the phase difference ϕ is larger than 0, it is possible to transfer electric power from the primary conversion circuit 20 to the secondary conversion circuit 30; whereas, when the phase difference ϕ is smaller than 0, it is possible to transfer electric power from the secondary conversion circuit 30 to the primary conversion circuit 20.

Thus, for example, when an external signal that requires the electric power conversion circuit 10 to operate in the mode F is input, the electric power conversion mode determination processing unit 502 determines to select the mode F. The on time δ determination processing unit 506 sets the on time δ that prescribes the step-up ratio in the case where the primary conversion circuit 20 is caused to function as a step-up circuit that steps up voltage input to the second input/output port PC and outputs the stepped-up voltage to the first input/output port PA. The secondary conversion circuit 30 functions as a step-down circuit that steps down voltage input to the third input/output port PB at the step-down ratio prescribed by the on time δ set by the on time δ determination processing unit 506 and outputs the stepped-down voltage to the fourth input/output port PD. Furthermore, the phase difference ϕ determination processing unit 504 sets the phase difference ϕ for transferring electric power, input to the first input/output port PA, to the third input/output port PB at a desired amount of electric power transferred.

The primary switching processing unit 508 executes switching control over the switching elements, that is, the primary first upper arm U1, the primary first lower arm/U1, the primary second upper arm V1 and the primary second lower arm/V1, such that the primary conversion circuit 20 is caused to function as the step-up circuit and the primary conversion circuit 20 is caused to function as part of the DC-DC converter circuit.

The secondary switching processing unit 510 executes switching control over the switching elements, that is, the secondary first upper arm U2, the secondary first lower arm/U2, the secondary second upper arm V2 and the secondary second lower arm/V2, such that the secondary conversion circuit 30 is caused to function as the step-down circuit and the secondary conversion circuit 30 is caused to function as part of the DC-DC converter circuit.

As described above, it is possible to cause each of the primary conversion circuit 20 and the secondary conversion circuit 30 to function as the step-up circuit or the step-down circuit, and it is possible to cause the electric power conversion circuit 10 to also function as the bidirectional DC-DC converter circuit. Thus, it is possible to convert electric power in all of the electric power conversion modes A to L, in other words, it is possible to convert electric power between the two input/output ports selected from among the four input/output ports.

<Control Over Step-Up/Step-Down Ratio of Electric Power Conversion System 100>

When no failure is detected in any one of the plurality of arm circuits configured in the primary full-bridge circuit 200 and the secondary full-bridge circuit 300, the failure detection unit 512 outputs a failure non-detection signal (normal signal). When the failure non-detection signal has been output, the short circuit processing unit 514 causes the primary bypass circuit 220 and the secondary bypass circuit 320 to operate such that both ends of each of the coils configured in the transformer 400 are not short-circuited. For example, the short circuit processing unit 514 causes both the primary first short circuit control element X1 and the primary second short circuit control element Y1 to switch into the off state such that both ends of the primary coil 202 are not short-circuited. Similarly, the short circuit processing unit 514 causes both the secondary first short circuit control element X2 and the secondary second short circuit control element Y2 to switch into the off state such that both ends of the secondary coil 302 are not short-circuited.

The on time δ determination processing unit 506 equalizes the on time δ of each of U1, V1, U2, V2 such that the step-up/step-down ratio of each of the primary conversion circuit 20 and the secondary conversion circuit 30 is equal to each other in order to normally operate transfer of electric power between the primary conversion circuit 20 and the secondary conversion circuit 30 (see FIG. 4, and each on time δ=primary on time δ1=secondary on time δ2=time value α).

The step-up/step-down ratio of the primary conversion circuit 20 depends on a duty ratio that is the ratio of the on time δ to a switching period T of each of the switching elements configured in the primary full-bridge circuit 200. Similarly, the step-up/step-down ratio of the secondary conversion circuit 30 depends on a duty ratio that is the ratio of the on time δ to a switching period T of each of the switching elements configured in the secondary full-bridge circuit 300. The step-up/step-down ratio of the primary conversion circuit 20 is a transformation ratio between the first input/output port PA and the second input/output port PC. The step-up/step-down ratio of the secondary conversion circuit 30 is a transformation ratio between the third input/output port PB and the fourth input/output port PD.

Thus, when electric power is transferred between the primary conversion circuit 20 and the secondary conversion circuit 30, for example, the following mathematical expressions hold.

Step-up/step-down ratio of the primary conversion circuit 20=(Voltage of the second input/output port $PC$)/(Voltage of the first input/output port $PA$)=$\delta 1/T=\alpha/T$ (Step-up/step-down ratio of the secondary conversion circuit 30)=(Voltage of the fourth input/output port $PD$)/(Voltage of the third input/output port $PB$)=$\delta 2/T=\alpha/T$ That is, the step-up/step-down ratio of each of the primary conversion circuit 20 and the secondary conversion circuit 30 is a value (=α/T) equal to each other.

The on time δ1 indicates the on time of each of the primary first upper arm U1 and the primary second upper arm V1, and the on time δ2 indicates the on time of each of the secondary first upper arm U2 and the secondary second upper arm V2.

On the other hand, the failure detection unit 512 outputs a failure detection signal (abnormal signal) when a failure of any one of the plurality of arm circuits configured in the primary full-bridge circuit 200 and the secondary full-bridge circuit 300 has been detected.

When the failure detection signal has been output, the electric power conversion mode determination processing unit 502 sets the operation mode of the primary conversion circuit 20 to a mode in which electric power is converted between the primary ports, and sets the operation mode of the secondary conversion circuit 30 to a mode in which electric power is converted between the secondary ports. Thus, the primary full-bridge circuit 200 converts electric power between the first input/output port PA and the second input/output port PC, and the secondary full-bridge circuit 300 converts electric power between the third input/output port PB and the fourth input/output port PD.

In addition, when the failure detection signal has been output, the electric power conversion mode determination processing unit 502 sets the operation mode of the electric power conversion circuit 10 to a mode in which electric power is converted by the arm circuits, other than the faulty arm circuit, among the plurality of arm circuits configured in the full-bridge circuits 200, 300.

For example, the electric power conversion mode determination processing unit 502 sets the operation mode of the full-bridge circuit in which the faulty arm circuit is present among the plurality of arm circuits to a mode in which electric power is converted by the arm circuit that is paired with the faulty arm circuit. For example, when a failure of only the primary second arm circuit 211 has been detected, the primary full-bridge circuit 200 converts electric power between the first input/output port PA and the second input/output port PC by turning on or off each of the switching elements configured in the primary first arm circuit 207. In addition, for example, when a failure of the primary second arm circuit 211 and the secondary first arm circuit 307 has been detected, the primary full-bridge circuit 200 converts electric power with the use of the primary first arm circuit 207, and the secondary full-bridge circuit 300 converts electric power with the use of the secondary second arm circuit 311.

On the other hand, the electric power conversion mode determination processing unit 502 sets the operation mode of the full-bridge circuit in which no faulty arm circuit is present among the plurality of arm circuits to a mode in which electric power is converted with the use of all the two arm circuits configured in the full-bridge circuit. For example, when a failure of the primary second arm circuit 211 has been detected, the secondary full-bridge circuit 300 converts electric power between the third input/output port PB and the fourth input/output port PD by turning on or off each of the switching elements configured in the secondary first arm circuit 307 and the secondary second arm circuit 311.

Through the above control, even when there occurs a failure in part of the arm circuits formed in the primary full-bridge circuit 200 and the secondary full-bridge circuit 300, it is possible to continue to convert electric power between the primary ports, and it is possible to continue to convert electric power between the secondary ports. In addition, even when there occurs a failure in part of the arm circuits, it is possible to prevent a stop of supply of electric power to the ports.

In addition, when the failure detection signal has been output, the short circuit processing unit 514 causes the primary bypass circuit 220 and the secondary bypass circuit 320 to carry out short circuit operation such that both ends of each of the coils configured in the transformer 400 are short-circuited. For example, the short circuit processing unit 514 causes both the primary first short circuit control element X1 and the primary second short circuit control element Y1 to switch into the on state such that both ends of the primary coil 202 are short-circuited. Similarly, the short circuit processing unit 514 causes both the secondary first short circuit control element X2 and the secondary second short circuit control element Y2 to switch into the on state such that both ends of the secondary coil 302 are short-circuited.

When both ends of each of the primary coil 202 and the secondary coil 302 are short-circuited, transfer of electric power through the transformer 400 does not function, so the short circuit processing unit 514 stops transfer of electric power between the primary conversion circuit 20 and the secondary conversion circuit 30.

When both ends of each of the primary coil 202 and the secondary coil 302 are short-circuited, magnetic coupling between the primary conversion circuit 20 and the secondary conversion circuit 30 is disconnected. At least one power supply is connected to each of the primary input/output ports and the secondary input/output ports (in the case of FIG. 1, the primary low voltage system power supply PSC is connected to one of the primary ports, and the secondary high voltage system power supply PSB is connected to one of the secondary ports). Therefore, electric power is converted independently between the primary side and the secondary side, so, even when there occurs a failure in part of the arm circuits, it is possible to temporarily ensure the voltages of all the four ports.

Figure 5:
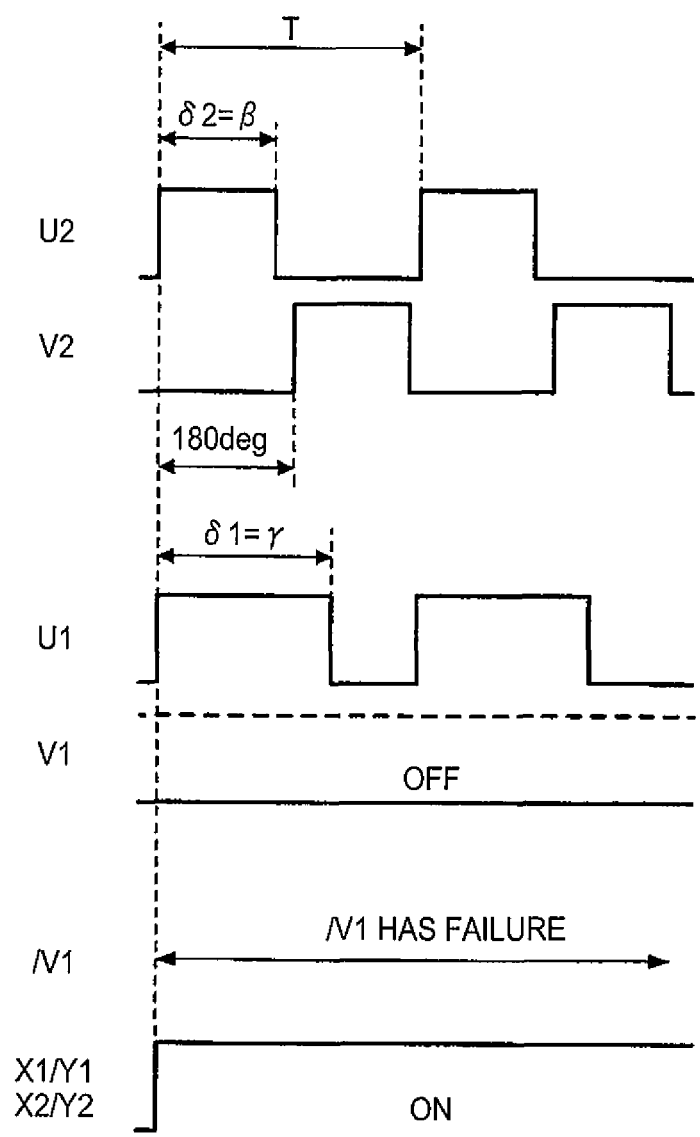
FIG. 5 is a timing chart at the time of a failure according to the embodiment.

In addition, both ends of each of the primary coil 202 and the secondary coil 302 are short-circuited, so the on time δ determination processing unit 506 is able to change each of the primary on time δ1 and the secondary on time δ2 to a selected value as shown in FIG. 5. Therefore, it is possible to cause each of the primary conversion circuit 20 and the secondary conversion circuit 30 to carry out step-up/step-down operation at a selected step-up/step-down ratio. At this time, no electric power is transferred between the primary conversion circuit 20 and the secondary conversion circuit 30, so the phase difference φ may be a selected value (FIG. 5 shows the case where φ=0).

Thus, when the step-up/step-down ratios of the primary conversion circuit 20 and the secondary conversion circuit 30 are controlled to mutually different values, for example, the following mathematical expressions hold.

(Step-up/step-down ratio of the primary conversion circuit 20)=(Voltage of the second input/output port *PC*)/(Voltage of the first input/output port *PA*)=δ1/*T*=γ/*T*

(Step-up/step-down ratio of the secondary conversion circuit 30)=(Voltage of the fourth input/output port *PD*)/(Voltage of the third input/output port *PB*)=δ2/*T*=β/*T*

(where β, γ denote time values).

In FIG. 5, the on time δ1 denotes the on time of each of the primary first upper arm U1 and the primary second upper arm V1, and the on time δ2 denotes the on time of each of the secondary first upper arm U2 and the secondary second upper arm V2.

In this way, it is possible to cause each of the primary conversion circuit 20 and the secondary conversion circuit 30 to carry out step-up/step-down operation at a selected step-up/step-down ratio. In addition, when both ends of each of the primary coil 202 and the secondary coil 302 are short-circuited, it is possible to carry out step-up/step-down operation without any loss in the primary coil 202 and the secondary coil 302, so step-up/step-down efficiency increases.

Figure 3:
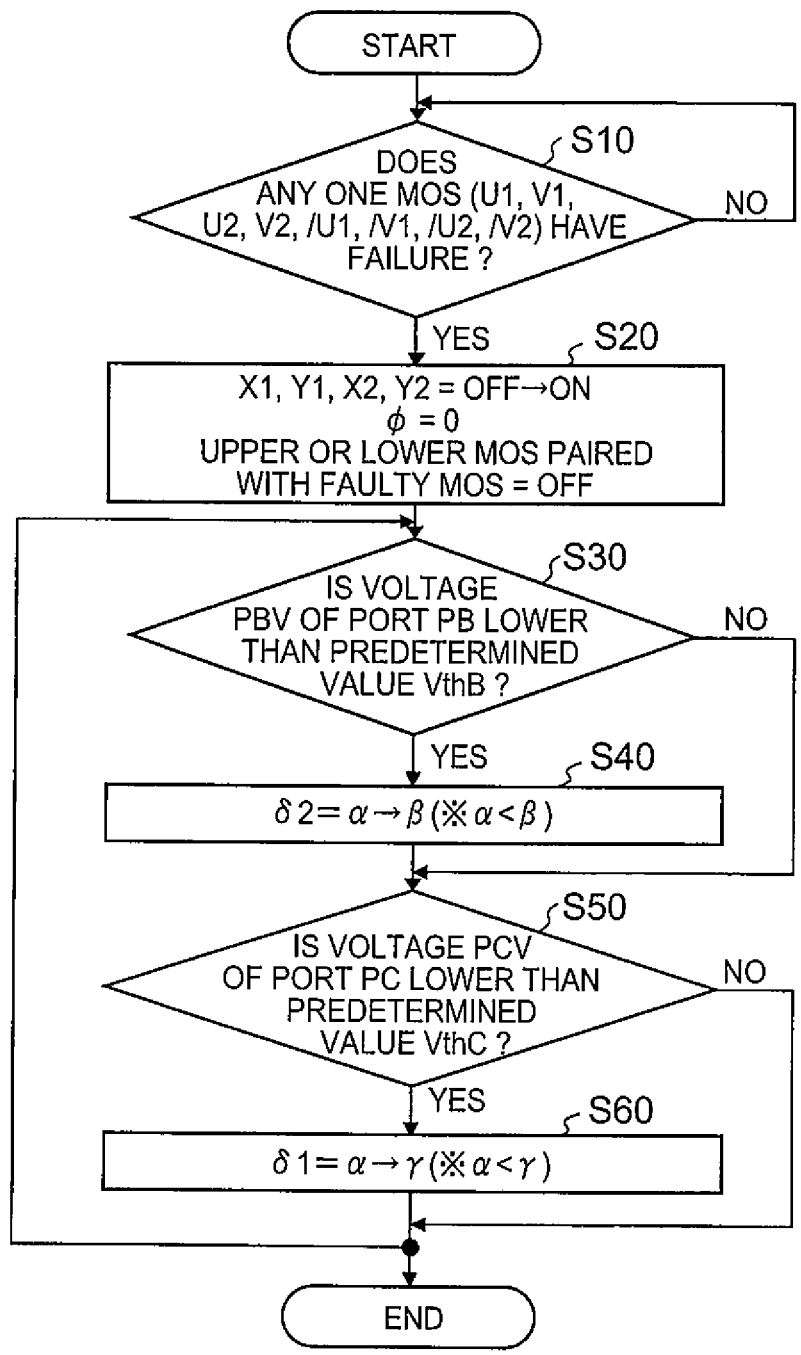
FIG. 3 is a flowchart of a control logic of an electric power conversion method according to the embodiment.

FIG. 3 is an example of a flowchart of a control logic that is executed by the control circuit 50.

In step S10, the failure detection unit 512 determines whether there occurs a failure in any one of the eight switching elements formed in the primary full-bridge circuit 200 and the secondary full-bridge circuit 300.

In step S20, when a failure of any one of the eight switching elements has been detected, the short circuit processing unit 514 causes all the primary short circuit control elements X1, Y1 and the secondary short circuit control elements X2, Y2 to switch from the off state to the on state (see FIG. 5). Thus, both ends of each of the primary coil 202 and the secondary coil 302 are short-circuited, transfer of electric power between the primary conversion circuit 20 and the secondary conversion circuit 30 is stopped at the time of a failure of any one of the arm circuits configured in the full-bridge circuits. Substantially simultaneously with a stop of transfer of electric power, the electric power conversion mode determination processing unit 502 sets the operation mode of the primary conversion circuit 20 to the mode in which electric power is converted between the primary ports, and sets the operation mode of the secondary conversion circuit 30 to the mode in which electric power is converted between the secondary ports.

In step S20, the phase difference φ determination processing unit 504 sets the phase difference φ to zero (however, the set value may be selected).

In addition, in step S20, the on time δ determination processing unit 506 turns off the switching element that is configured in the faulty arm circuit and that is paired with the faulty switching element. That is, the on time δ of the paired switching element is set to zero. For example, when the faulty element is the high-side switching element, the low-side switching element is turned off; whereas, when the faulty element is the low-side switching element, the high-side switching element is turned off. Through this control, it is possible to prevent flow-through current from flowing through the upper and lower switching elements by turning on the switching element that is paired with the switching element having a short-circuit failure. FIG. 5 shows an example in which, when a failure of the primary second lower arm/V1 has been detected, the primary second upper arm V1 that is paired with the primary second lower arm/V1 is turned off.

The primary switching processing unit 508 converts electric power between the primary ports by turning on or off each of the remaining switching elements other than the faulty switching element and the switching element paired with the faulty switching element. The secondary switching processing unit 510 converts electric power between the secondary ports by turning on or off each of the remaining switching elements other than the faulty switching element and the switching element paired with the faulty switching element.

On the other hand, the voltage monitor unit 70 monitors the voltages of the ports to which the external power supplies, such as batteries, are connected. In the processes of step S30 to step S60, the on time δ determination processing unit 506 varies (increases) the on time δ when any one of the monitored voltage values becomes lower than or equal to a predetermined value that indicates that the corresponding external power supply, such as the battery, has been discharged and the state of charge has decreased to a predetermined threshold.

Thus, it is possible reduce the step-up/step-down ratio between the primary ports, that is, between the first input/output port PA and the second input/output port PC, or reduce the step-up/step-down ratio between the secondary ports, that is, between the third input/output port PB and the fourth input/output port PD. Through this control, it is possible to reduce electric power consumed in the full-bridge circuit of which the step-up/step-down ratio is reduced, so it is possible to suppress the electric power consumption of the external power supply, such as the battery, connected to the port of which the detected voltage is lower than or equal to a predetermined voltage value.

In step S30, the on time δ determination processing unit 506 does not change the secondary on time δ2 and keeps the secondary on time δ2 at α when the voltage PBV of the third input/output port PB to which the secondary high voltage system power supply PSB is connected is not lower than a predetermined value VthB. On the other hand, the on time δ determination processing unit 506 changes the on time δ2 from α to β when the voltage PBV is lower than the predetermined value VthB (step S40 and see FIG. 4 and FIG. 5, and β is higher than α).

Similarly, in step S50, the on time δ determination processing unit 506 does not change the primary on time δ1 and keeps the primary on time δ1 at α when the voltage PCV of the second input/output port PC to which the primary low voltage system power supply PSC is connected is not lower than a predetermined value VthC. On the other hand, the on time δ determination processing unit 506 changes the on time δ1 from α to γ when the voltage PCB is lower than the predetermined value VthC (step S60 and see FIG. 4 and FIG. 5, and γ is higher than α).

If the step-up/step-down ratio is excessively reduced, a load connected to each input/output port may not be able to operate, so the step-up/step-down ratio is desirably set such that the voltage of each input/output port is higher than or equal to a minimum operation voltage that is determined on the basis of the load. Because the primary side and the secondary side are disconnected from each other, the step-up/step-down ratio may be selectively set for each of the primary side and the secondary side.

When the arm circuits have no failure and are in an original normal state, it is possible to charge the external power supplies, such as batteries, connected to the corresponding input/output ports by transferring electric power to each other between the primary side and the secondary side. However, when the primary side and the secondary side are disconnected from each other, it is not possible to charge electric power between the primary side and the secondary side. Therefore, in the case where the state of charge of any one of the external power supplies, such as the batteries, has decreased, it is possible to prevent non-operation of electric power conversion by suppressing consumed electric power even when the performance is sacrificed to some extent (fail-safe control).

When the present embodiment is applied to a so-called hybrid vehicle, the secondary high voltage system power supply PSB that is a high-voltage battery is charged from the inverter connected to the third input/output port PB, so the state of charge of the secondary high voltage system power supply PSB is hard to decrease. In contrast to this, the primary low voltage system power supply PSC that is a low-voltage auxiliary battery has a relatively large amount of electric power supplied from the secondary side, so the state of charge of the primary low voltage system power supply PSC tends to decrease in a state where the primary side and the secondary side are disconnected from each other. Thus, through the above control, it is possible to suppress the electric power consumption of the external power supply for a period of time as long as possible until a user drives the vehicle to a repair shop, or the like.

If the step-up/step-down ratio is the same between the primary side and the secondary side, the battery having a sufficient state of charge also has a small step-up/step-down ratio, so marketability may decrease. However, it is possible to change the step-up/step-down ratio to a selected value on the basis of the voltage state (state of charge) of the external power supply, such as the battery, connected to the corresponding input/output port, so marketability improves.

The electric power conversion system and the electric power conversion method are described by way of the embodiment; however, the invention is not limited to the above-described embodiment. The scope of the invention encompasses various modifications and improvements, such as combinations and replacements of the above-described embodiment with part or all of another embodiment.

For example, in the above-described embodiment, the MOSFET that is a semiconductor element that carries out on/off operation is described as an example of each switching element. However, each switching element may be, for example, a voltage-controlled power element with an insulated gate, such as an IGBT and a MOSFET, or may be a bipolar transistor.

In addition, in the above-described embodiment, when the step-up/step-down ratios of the primary side and secondary side are changed to different values, both the primary bypass circuit 220 and the secondary bypass circuit 320 are caused to carry out short circuit operation. Instead, any one of the primary bypass circuit 220 and the secondary bypass circuit 320 may be caused to carry out short circuit operation.

In addition, when one of the arm circuits configured in any one of the full-bridge circuits is caused to carry out step-up/step-down operation in a state where any of the upper and lower arms of the other one of the arm circuits are turned off, only the short circuit control element inserted between the midpoint of the one of the arm circuits and the center tap may be turned on.

For example, in FIG. 1, when the primary first arm circuit 207 is caused to carry out step-up/step-down operation in a state where the primary second upper arm V1 and the primary second lower arm/V1 are turned off, only the primary first short circuit control element X1 inserted in the bypass line between the midpoint 207m and the center tap 202m may be turned on. Thus, it is possible to short-circuit both ends of the primary first winding 202a configured in the transformer 400. In this case, the primary second short circuit control element Y1 may remain in the off state or the primary second short circuit control element Y1 itself may be omitted. Similarly, when the primary second arm circuit 211 is caused to carry out step-up/step-down operation in a state where the primary first upper arm U1 and the primary first lower arm/U1 are turned off, only the primary second short circuit control element Y1 inserted in the bypass line between the midpoint 211m and the center tap 202m may be turned on. Thus, it is possible to short-circuit both ends of the primary second winding 202b configured in the transformer 400. In this case, the primary first short circuit control element X1 may remain in the off state or the primary first short circuit control element X1 itself may be omitted. The same applies to the secondary side. Through the above control, it is possible to stop transfer of electric power between the primary side and the secondary side at the time of a failure of any one of the arm circuits.

In addition, when the step-up/step-down ratios of the primary side and secondary side are changed to different values, the duty ratios of the primary side and secondary side may be varied by varying the primary switching period T and the secondary switching period T from each other (see FIG. 5).

In addition, a power supply may be connected to the first input/output port PA or a power supply may be connected to the fourth input/output port PD. In addition, a power supply may not be connected to the second input/output port PC or a power supply may not be connected to the third input/output port PB.

What is claimed is:

1. An electric power conversion method comprising:
   among four ports including a first port and a second port of a primary circuit and a third port and a fourth port of a secondary circuit magnetically coupled to the primary circuit by a transformer, converting electric power between any two of the four ports with the use of a primary electric power conversion unit configured in the primary circuit and a secondary electric power conversion unit configured in the secondary circuit; and
   when there occurs a failure in any one of a plurality of electric power conversion circuit portions configured in the primary and secondary electric power conversion units, converting electric power between the first port and the second port and between the third port and the fourth port with the use of the electric power conversion circuit portions other than the faulty electric power conversion circuit portion among the plurality of electric power conversion circuit portions, wherein
   the primary electric power conversion unit and the secondary electric power conversion unit are configured to stop transfer of electric power between the primary circuit and the secondary circuit when there is a failure in at least one of the primary electric power conversion unit and the secondary electric power conversion unit, and
   stopping transfer of electric power by disconnecting magnetic coupling between the primary circuit and the secondary circuit when there is the failure by short-circuiting both ends of each of coils formed in the transformer.

2. An electric power conversion system comprising:
   a primary circuit including a first port, a second port and a primary electric power conversion unit; and
   a secondary circuit magnetically coupled to the primary circuit by a transformer, the secondary circuit including a third port, a fourth port and a secondary electric power conversion unit, wherein
   the primary electric power conversion unit and the secondary electric power conversion unit are configured to convert electric power between any two of the four ports,
   electric power conversion circuit portions other than a faulty electric power conversion circuit portion among a plurality of electric power conversion circuit portions configured in the primary electric power conversion unit and the secondary electric power conversion unit are configured to convert electric power between the first port and the second port and between the third port and the fourth port, wherein
   the primary electric power conversion unit and the secondary electric power conversion unit are configured to stop transfer of electric power between the primary circuit and the secondary circuit when there is a failure in at least one of the primary electric power conversion unit and the secondary electric power conversion unit, and
   a control circuit configured to stop transfer of electric power by disconnecting magnetic coupling between the primary circuit and the secondary circuit when there is the failure by short-circuiting both ends of each of coils formed in the transformer.

3. The electric power conversion system according to claim 2, wherein the control circuit is configured to reduce a transformation ratio between one of a pair of the first port and the second port and a pair of the third port and the fourth port, including the port to which an external power supply is connected.

4. The electric power conversion system according to claim 2, wherein the control circuit is configured to reduce a transformation ratio between at least one of a pair of the first port and the second port and a pair of the third port and the fourth port.

5. The electric power conversion system according to claim 2, wherein the control circuit is configured to reduce a transformation ratio between one of a pair of the first port and the second port and a pair of the third port and the fourth port, including the port having a predetermined voltage value or below.

6. The electric power conversion system according to claim 2, wherein each of the electric power conversion units is a full-bridge circuit.

7. The electric power conversion system according to claim 6, wherein the plurality of electric power conversion circuit portions are a plurality of arm circuits configured in the full-bridge circuits.

8. The electric power conversion system according to claim 7, wherein, in the full-bridge circuit in which a faulty arm circuit is present among the plurality of arm circuits, the control circuit is configured to convert electric power with the use of the arm circuit paired with the faulty arm circuit.

9. The electric power conversion system according to claim 8, wherein the control circuit is configured to turn off a switching element paired with a faulty switching element configured in the faulty arm circuit.

* * * * *